3,204,751
CONTROLS FOR FEEDING ELONGATED
ARTICLES
Helmut E. Durr, Summit, N.J., assignor to Western Electric Company, Incorporated, New York, N.Y., a corporation of New York
Filed July 19, 1963, Ser. No. 296,330
7 Claims. (Cl. 198—33)

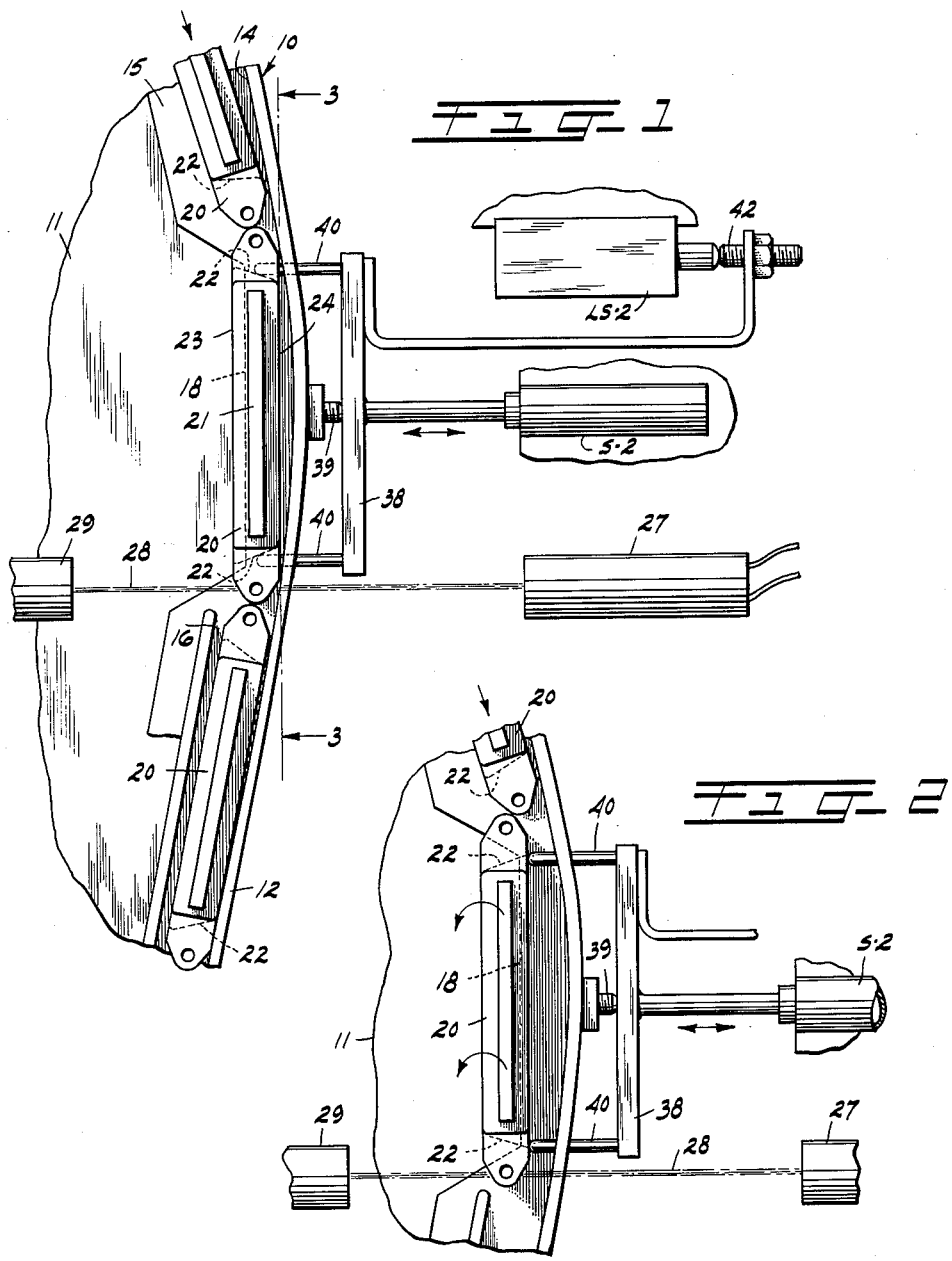

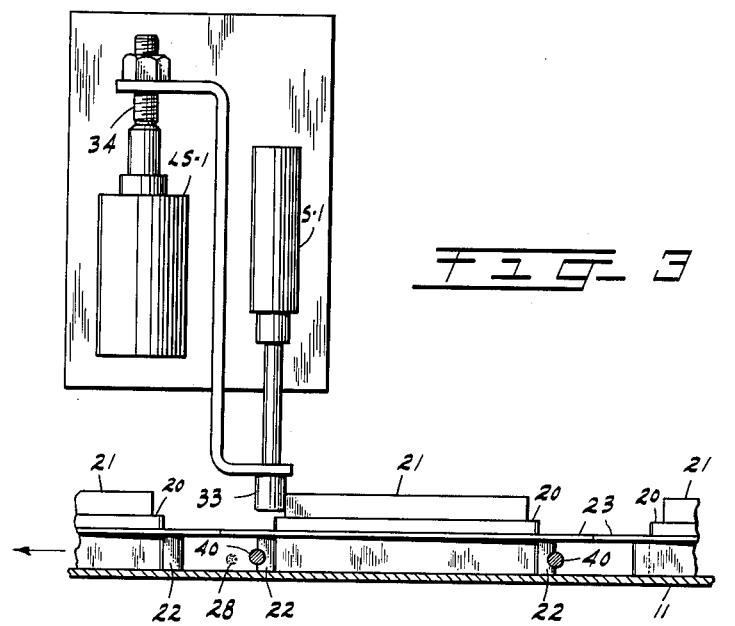
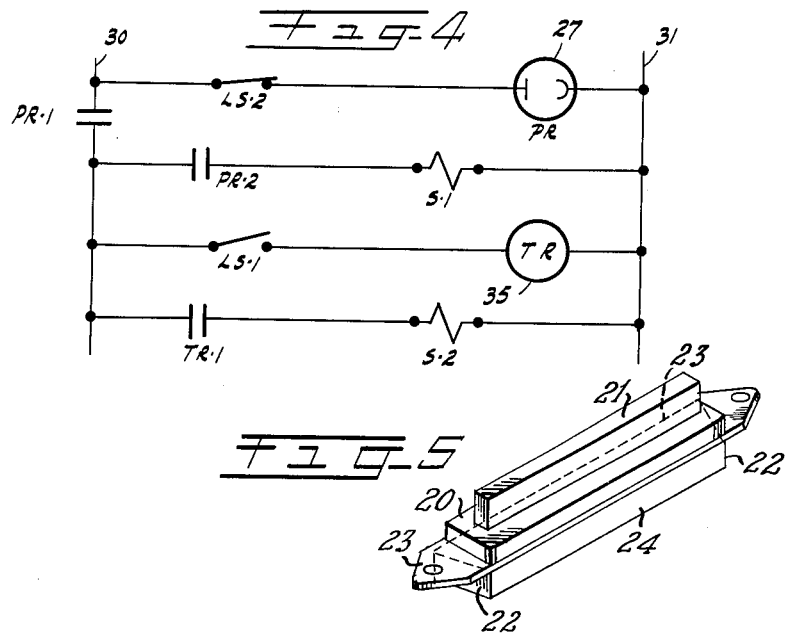

This invention relates to controls for feeding elongated articles particularly in association with vibrating feeders.

It is well known in the art that vibrating feeders, provided with internal peripheral tracks, are adapted to cause parts of various contours to move successively along the internal peripheral tracks to an exit track which leads out of the vibrator unit to areas where the articles are to be used. In many instances, the problem linked with feeders of this type is the orientation of the parts to be sure that they enter the exit track only in one position so that they may be ready for use when they leave the exit track. This problem becomes more difficult when the articles are substantially identical throughout and there is very little difference in their contours, particularly the opposing sides, either of which may move along the inner periphery of the feeder.

In the present instance the opposing sides of the articles being moved in the feeder differ only in length, that is, one is shorter than the other and the problem is to have the short side of each article facing the inner periphery of the feeder as it enters the exit track.

An object of this invention is to provide a control for feeding elongated articles which have a long side and an opposing short side to orient the articles such that the long side or the short side faces the inner periphery of a feeder.

In accordance with the object, the control includes a narrow track portion interposed between an internal peripheral track and an exit track of a feeder with means to stop each article on the narrow track portion. A pusher is provided at the narrow track portion to move free of the article when adjacent the short side thereof, but to engage each article when adjacent the long side thereof to push the incorrectly positioned articles off the narrow track portion back into the feeder.

Other objects and advantages will be apparent from the following detailed description when considered in conjunction with the accompanying drawings wherein:

FIG. 1 is a fragmentary portion of a top plan view of a vibrating feeder embodying the invention;

FIG. 2 is a similar to FIG. 1 showing the ejection of an incorrectly positioned article;

FIG. 3 is a fragmentary vertical sectional view taken along line 3—3 of FIG. 1;

FIG. 4 is a schematic illustration of the electrical features of the control, and FIG. 5 is a pictorial view of a typical article having a long side and an opposite short side.

In the present instance, a conventional vibrating feeder 10, circular in general contour has a bottom portion 11 to support articles and an outer wall 12 with an inner periphery 14. The feeder 10 operates in a conventional manner causing articles to move not only outwardly toward the inner peripheral wall 14, but to ride on an internal peripheral track 15 extending about the inner periphery 14 and eventually guiding the articles toward an exit track 16 leading out of and away from the feeder 10. A narrow track portion 18 is interposed between the end of the inner peripheral track 15 and the entrance end of the exit track 16.

In the present instance, the articles 20 (as best seen in FIG. 5) to be fed may be key connectors, each being provided with fifty contacts (not shown), twenty-five on each side of a narrow upper portion 21 to which individual wires are to be connected and electrical connections may be completed with other units through their inner ends. It is important, however, that the articles be advanced to the wiring stations in a definite order. The only difference in the structures of the articles, particularly the side of the articles which move along the inner periphery 14 of the feeder 10, is the variations of the lengths of the two sides of the article. It will be noticed that ends 22 of the main lower portions of each article moving on the tracks are tapered inwardly from long sides 23 to short sides 24. It is important that the articles 20 move onto the exit track 16 with their short sides 24 adjacent to the inner periphery 14.

With reference to FIGS. 1 and 2, the control includes a photoelectric eye 27 activated by a light ray 28 from a source or light 29 after one article leaves the narrow track portion 18 and enters the exit track 16 or is moved off the narrow track portion back into the feeder. In FIG. 4, the photoelectric eye 27 is shown in a circuit with a normally closed switch LS–2 between lines 30 and 31 of a 110 volt alternating current supply. When the photoelectric eye 27 is activated by the light ray 28, the normally open contacts PR–1 and PR–2 are closed. Contacts PR–1 are in line 30 conditioning other circuits for operation and contacts PR–2 are in a circuit with solenoid S–1 shown also in FIG. 3.

Solenoid S–1 operates a stop 33 into the path of articles on the tracks 15 and 18 to stop the next article on the narrow track portion 18. When the solenoid S–1 is operated into its stopping position shown in FIG. 3, a member 34 movable with the stop actuates the switch LS–1 to a closed position to complete a circuit in FIG. 4 through a time delay relay 35. When relay 35 is actuated, contact TR–1 will close to complete a circuit through solenoid S–2 shown in FIGS. 1 and 2. Solenoids S–1 and S–2 are of the type provided with springs to return them to their normal positions.

Solenoid S–2 carries a bar 38 movable into engagement with an adjustable stop 39 supported by the outer periphery of the feeder 10. The bar 38 may be defined as a pusher provided with fingers 40 with rounded outer ends adapted to move beyond the ends of the short side 24 of each article when in the position shown in FIG. 1 or to engage the long side of each article adjacent the ends 22 as in FIG. 2 to move the incorrectly positioned article off the narrow track portion 18 back into the feeder 10. An adjustable member 42 is carried by the pusher or bar 38 to open switch LS–2 when bar 38 is moved into engagement with stop 39. This action opens contacts PR–1 and PR–2 to de-energize solenoids S–1 and S–2 as well as relay 35. This results in the solenoids S–1 and S–2 returning to their starting positions ready to carry out the control for the next article moving onto the narrow track portion.

*Operation*

With the control mounted on a conventional feeder and including the modification to provide a narrow track portion 18 interposed between the internal peripheral track 15 and the exit track 16, there is an automatic stopping of each article on the narrow track portion and the operation of the pusher 38 which will carry out its operation without disturbance to an article in a correct position, but will push an incorrectly positioned article off the narrow portion back into the feeder.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A control for feeding like elongated articles, each having a long side and an opposing short side, successively along an internal peripheral track of a given width in a feeder toward an exit track comprising:
- a track portion of a narrower width than the given width interposed between the internal peripheral track and the exit track,
- means responsive to an article leaving the narrower track portion for stopping the subsequent articles at a given position on the narrower track portion, and
- a pusher movable relative to each stopped article for moving free of articles with their short sides disposed adjacent the pusher and for engaging articles with their long sides disposed adjacent the pusher to move them off the narrow track portion back into the feeder.

2. A control for feeding like elongated articles according to claim 1 in which:
- a photoelectric unit is rendered effective by each article leaving the narrow track portion for operating the stopping means for each subsequent article.

3. A control for feeding like elongated articles according to claim 1 in which:
- means is responsive to the operation of the pusher for resetting the stop means and pusher in their normal positions for the next article.

4. A control for feeding like elongated articles, each having a long side and an opposing short side, successively along an internal peripheral track of a given width in a vibrating feeder toward an exit track, comprising
- a narrow track portion interposed between the internal peripheral track and the exit track,
- means operable to stop the articles at a given position on the narrow track portion, and
- a pusher, movable relative to each stopped article, and adapted to move free of articles with their short sides disposed adjacent the pusher and to engage articles with their long sides disposed adjacent the pusher and move them off the narrow track portion back into the feeder, the pusher having fingers spaced with respect to each other to extend beyond the opposite end portions of the short sides and to engage opposite end portions of the long sides.

5. A control for feeding elongated articles, each having a long side and an opposing short side, successively along an internal peripheral track of a given width in a feeder toward an exit track, comprising
- a track portion of a narrower width than the given width interposed between the internal peripheral track and the exit track,
- means for stopping each of the articles at a given position on the narrower track portion,
- a pusher movable relative to each stopped article for moving free of articles with their short sides disposed adjacent the pusher and for engaging articles with their long sides dispoed adjacent the pusher to move them off the narrow portion back into the feeder,
- and a photoelectric unit rendered effective by each article leaving the narrower track portion for operating the stopping means and for conditioning the pusher for operation.

6. A control for feeding elongated articles according to claim 5, wherein
- the pusher has fingers spaced with respect to each other to extend beyond the ends of the short sides and to engage the ends of the long sides.

7. A control for feeding elongated articles according to claim 6, further comprising
- a time delay means responsive to the operation of the stopping means for operating the pusher subsequent to the operation of the stopping means.

References Cited by the Examiner

UNITED STATES PATENTS

| | | | |
|---|---|---|---|
| 2,661,833 | 12/53 | Spurlin | 198—220 |
| 3,133,670 | 5/64 | Heyer | 221—9 |

SAMUEL F. COLEMAN, *Primary Examiner.*

WILLIAM B. LA BORDE *Examiner.*